United States Patent
Chen et al.

(10) Patent No.: US 8,799,438 B2
(45) Date of Patent: Aug. 5, 2014

(54) GENERIC AND AUTOMATIC ADDRESS CONFIGURATION FOR DATA CENTER NETWORKS

(75) Inventors: Kai Chen, Evanston, IL (US); Chuanxiong Guo, Jiangsu (CN); Haitao Wu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 391 days.

(21) Appl. No.: 12/967,340

(22) Filed: Dec. 14, 2010

(65) Prior Publication Data

US 2012/0151026 A1    Jun. 14, 2012

(51) Int. Cl.
*G06F 15/173*    (2006.01)
*G06F 15/177*    (2006.01)
*G06F 15/16*    (2006.01)
*G06F 17/00*    (2006.01)

(52) U.S. Cl.
USPC ........... 709/223; 709/220; 709/243; 709/248; 707/758

(58) Field of Classification Search
USPC .................. 709/223, 220, 243, 248; 707/758
See application file for complete search history.

(56) References Cited

U.S. PATENT DOCUMENTS

| | | | |
|---|---|---|---|
| 6,360,227 B1 * | 3/2002 | Aggarwal et al. | 1/1 |
| 7,117,258 B2 | 10/2006 | Lee et al. | |
| 7,185,072 B2 | 2/2007 | Hada et al. | |
| 2001/0047484 A1 | 11/2001 | Medvinsky et al. | |
| 2004/0054807 A1 * | 3/2004 | Harvey et al. | 709/243 |
| 2004/0258074 A1 | 12/2004 | Williams et al. | |
| 2005/0027778 A1 * | 2/2005 | Dimitrelis et al. | 709/200 |
| 2007/0005808 A1 * | 1/2007 | Day | 709/248 |
| 2009/0006585 A1 | 1/2009 | Chen | |
| 2009/0323556 A1 | 12/2009 | Liu et al. | |
| 2010/0040070 A1 * | 2/2010 | Suh et al. | 370/400 |
| 2010/0063973 A1 * | 3/2010 | Cao et al. | 707/758 |

OTHER PUBLICATIONS

Kai Chen et al., "Generic and Automatic Address Configuration for Data Center Networks", Sep. 9, 2010, SIGCOMM 2010 Proceedings of the ACM SIGCOMM '10 conference, ACM New York, NY, USA © 2010.*

Barroso, et al., "Web Search for a Planet: The Google Cluster Architecture", retrieved on Aug. 12, 2010 at <<http://citeseerx.ist.psu.edu/viewdoc/download?doi=10.1.1.93.2712&rep=rep1&type=pdf>>, IEEE Computer Society, IEEE Micro, vol. 23, 2003, pp. 22-28.

Cheshire, et al., "Dynamic Configuration of IPv4 Link—Local Addresses", retrieved on Aug. 13, 2010 at <<http://www.ietf.org/rfc/rfc3927.txt>>, The Internet Society, May 2005, pp. 1-31.

(Continued)

*Primary Examiner* — Emmanuel L Moise
*Assistant Examiner* — Vitali Korobov
(74) *Attorney, Agent, or Firm* — Carole Boelitz; Micky Minhas; Lee & Hayes, PLLC

(57) ABSTRACT

This application describes a system and method for auto configuring data center networks. The networks include a plurality of electronic devices that may include switches, servers, routers, or any other device that may be used in a data center network. Graph theory is applied to the arrangement of the network devices to determine if the intended design of the data network matches the actual implementation of the network. This may be achieved by resolving the blueprint graph with the physical graph to determine if they are isomorphic. Also, the isomorphic techniques may be used to detect miswirings in the network that do not cause a node degree change for any of the network components.

20 Claims, 11 Drawing Sheets

(56) References Cited

OTHER PUBLICATIONS

Darga, et al., "Exploiting Structure in Symmetry Generation for CNF," in 41st Design Automation Conference, 2004, 5 pages.

Darga, et al., "Faster Symmetry Discovery using Sparsity of Symmetries", retrieved on Aug. 12, 2010 at <<http://www.cse.umich.edu/~imarkov/pubs/conf/dac08-sym.pdf>>, ACM, Proceedings of Annual Design Automation Conference, Anaheim, California, 2008, pp. 149-154.

Dean, et al., "MapReduce: Simplified Data Processing on Large Clusters", retrieved on Aug. 12, 2010 at <<http://labs.google.com/papers/mapreduce-osdi04.pdf>>, USENIX Association, Proceedings of Conference on Symposium on Operating Systems Design and Implementation (OSDI), San Francisco, California, vol. 6, 2004, pp. 1-13.

"DHCP Overview", retrieved on Aug. 12, 2010 at <<http://www.cisco.com/en/US/docs/ios/ipaddr/configuration/guide/iad_dhcp_ovrvw_ps6350_TSD_Products_Configuration_Guide_Chapter.html>>, Cisco Systems, Inc., Cisco IOS IP Addressing Services Configuration Guide, Release 12.4, May 2, 2005, pp. 1-8.

"Dynamic Host Configuration Protocol", retrieved on Aug. 12, 2010 at <<http://www.sun.com/software/whitepapers/wp-dhcp/dhcp-wp.pdf>>, Sun Microsystems, Inc., Technical White Paper, Aug. 2000, pp. 1-22.

Ghemawat, et al., "The Google File System", retrieved on Aug. 12, 2010 at <<http://static.googleusercontent.com/external_content/untrusted_dlcp/labs.google.com/en//papers/gfs-sosp2003.pdf>>, ACM SIGOPS Operating Systems Review (SOSP), vol. 37, No. 5, Dec. 2003, pp. 29-43.

"Graph automorphism", retrieved on Aug. 11, 2010 at <<http://en.wikipedia.org/wiki/Graph_automorphism>>, Wikipedi, Jul. 21, 2010, pp. 1-4.

"Graph isomorphism problem", retrieved on Aug. 11, 2010 at <<http://en.wikipedia.org/wiki/graph_isomorphism_problem>>, Wikipedia, Jun. 3, 2010, pp. 1.

Greenberg, et al., "VL2: A Scalable and Flexible Data Center Network", retrieved on Aug. 12, 2010 at <<http://research.microsoft.com/pubs/80693/vl2-sigcomm09-final.pdf>>, ACM, Proceedings of SIGCOMM Conference on Data Communication, Barcelona, Spain, Aug. 2009, pp. 51-62.

Guo, et al., "BCube: A High Performance, Server-centric Network Architecture for Modular Data Centers", retrieved on 8-12-210 at <<http://citeseerx.ist.psu.edu/viewdoc/download;jsessionid=51F8606DC486B34EE50FEDBCDA1A4D7D?doi=10.1.1.149.9669&rep=rep1&type=pdf>>, ACM, Proceedings of SIGCOMM Conference on Data Communication, Barcelona, Spain, Aug. 2009, pp. 63-74.

Guo, et al., "DCell: A Scalable and Fault-Tolerant Network Structure for Data Centers", retrieved on Aug. 12, 2010 at <<http://citeseerx.ist.psu.edu/viewdoc/download?doi=10.1.1.160.3180&rep=rep1&type=pdf>>, ACM SIGCOMM Computer Communication Review, Seattle, Washington, vol. 38, No. 4, Aug. 2008, pp. 75-86.

"Human Errors Most Common Reason for Data Center Outages", retrieved on Aug. 11, 2010 at <<http://royal.pingdom.com/2007/10/30/human-errors-most-common-reason-for-data-center-outages/>>, Pingdom, Oct. 30, 2007, pp. 1-8.

Kann, "On the Approximability of the Maximum Common Subgraph Problem", retrieved on Aug. 12, 2010 at <<http://www.csc.kth.se/~viggo/papers/common.pdf>>, Springer-Verlag London, Lecture Notes in Computer Science—vol. 577, Proceedings of Annual Symposium on Theoretical Aspects of Computer Science, 1992, pp. 377-388.

Katz, "Tech Titans Building Boom: Google, Microsoft, and other internet giants race to build the Mega Data Centers that will power Cloud Computing", retrieved on Aug. 11, 2010 at <<http://ieeexplore.ieee.org/stamp/stamp.jsp?tp=&arnumber=4768855>>, IEEE Spectrum, Feb. 2009, pp. 40-54.

Kerravala, "As the Value of Enterprise Networks Escalates, So Does the Need for Configuration Management", retrieved on Aug. 12, 2010 at <<http://www.firemon.com/download/library/Need_For_Config_MGT.pdf>>, the Yankee Group Report, Jan. 2004, pp. 1-12.

Kim, et al., "Floodless in Seattle: A Scalable Ethernet Architecture for Large Enterprises", retrieved on Aug. 12, 2010 at <<http://www.cs.princeton.edu/~chkim/Research/SEATTLE/seattle.pdf>>, ACM SIGCOMM Computer Communication Review, vol. 38, No. 4, Oct. 2008, pp. 1-14.

Li, et al., "FiConn: Using Backup Port for Server Interconnection in Data Centers", retrieved on Aug. 12, 2010 at <<http://citeseerx.ist.psu.edu/viewdoc/download?doi=10.1.1.160.5183&rep=rep1&type=pdf>>, IEEE INFOCOM, Rio de Janeiro, Brazil, Apr. 2009, pp. 2276-2285.

Luks, "Isomorphism of Graphs of Bounded Valence Can Be Tested in Polynomial Time", retrieved on Aug. 11, 2010 at <<http://ieeexplore.ieee.org/stamp/stamp.jsp?tp=&arnumber=4567803>>, IEEE Computer Society, Proceedings of Annual Symposium on Foundations of Computer Science (SFCS), 1980, pp. 42-49.

"Maximum common subgraph isomorphism problem", retrieved on Aug. 11, 2010 at <<http://en.wikipedia.org/wiki/Maximum_common_subgraph_isomorphism_problem>>, Wikipedi, Dec. 7, 2009, pp. 1.

McFarlane, "Where do failures originate?", retrieved on Aug. 11, 2010 at <<http://searchdatacenter.techtarget.com/news/column/0,294698,sid80_gci1148903,00.html>>, TechTarget, Data Center News, Nov. 30, 2005, pp. 1-3.

McKay, "Practical Graph Isomophism", retrieved on Aug. 12, 2010 at <<http://cs.anu.edu.au/~bdm/papers/pgi.pdf>>, Congressus Numerantium, vol. 30, 1981, pp. 45-87.

Myers, et al., "Rethinking the Service Model: Scaling Ethernet to a Million Nodes", retrieved on Aug. 12, 2010 at <<http://citeseerx.ist.psu.edu/viewdoc/download?doi=10.1.1.120.4340&rep=rep1&type=pdf.>>, presented at HotNets, Nov. 2004, pp. 1-6.

Mysore, et al., "PortLand: A Scalable Fault-Tolerant Layer 2 Data Center Network Fabric", retrieved on Aug. 12, 2010 at <<http://cseweb.ucsd.edu/~vahdat/papers/portland-sigcomm09.pdf>>, ACM, Proceedings of SIGCOMM Conference on Data Communication, Barcelona, Spain, Aug. 2009, pp. 39-50.

Perlman, "Rbridges: Transparent Routing", retrieved on Aug. 12, 2010 at <<http://www.ieee-infocom.org/2004/Papers/26_1.PDF>>, IEEE INFOCOM, vol. 2, Mar. 2004, pp. 1211-1218.

Petersen, "Stateless Network Auto Configuration With IPv6", retrieved on Aug. 12, 2010 at <<http://linux.sys-con.com/node/166310>>, Ulitzer Inc., Linux, Dec. 27, 2005, pp. 1-10.

Rodeheffer, et al., "SmartBridge: A Scalable Bridge Architecture", retrieved on Aug. 12, 2010 at <<http://citeseerx.ist.psu.edu/viewdoc/download?doi=10.1.1.31.8698&rep=rep1&type=pdf>>, ACM SIGCOMM Computer Communication Review, vol. 30, No. 4, Oct. 2000, pp. 205-216.

Thomson, et al., "IPv6 Stateless Address Autoconfiguration", retrieved on Aug. 11, 2010 at <<http://www.ietf.org/rfc/rfc2462.txt>>, The Internet Society, Dec. 1998, pp. 1-24.

"What is Behind Network Downtime? Proactive Steps to Reduce Human Error and Improve Availability of Networks", retrieved on Aug. 12, 2010 at <<http://www.juniper.net/solutions/literature/white_papers/200249.pdf>>, Juniper Networks, White Paper, May 2008, pp. 1-12.

"Data Center Network Overview", Extreme Networks, 2009, retrieved on Sep. 15, 2010 at <<http://datacenterhub.info/result.php?Keywords=%E2%80%9CData+Center+Network+Overview+2C%E2%80%9D+Extreme+Networks>>, 2 pages.

"Personal communications with opeartor of a large enterprise data center," 2009, retrieved on Sep. 15, 2010 at <<http://datacenterhub.info/result.php?Keywords=%E2%80%9CPersonal+communications+with+opeartor+of+a+large+enterprise+data+center>>, 2 pages.

* cited by examiner

US 8,799,438 B2

GENERIC AND AUTOMATIC ADDRESS CONFIGURATION FOR DATA CENTER NETWORKS

BACKGROUND

As the internet and cloud computing play a greater role in an ever expanding networked society, the number and size of data centers will continue to increase to support the demand of users worldwide. Data centers provide cloud computing services such as Web search, online social networking, online office and Information Technology (IT) infrastructure for individuals and organizations around the world. Hence, data centers include tens or even hundreds of thousands of servers that share information between each other and other data centers over the Internet.

As data centers increase in size, the complexity in configuring and connecting hundreds of thousands of pieces of equipment by hand also increases. As new data centers become larger the amount of time and effort to configure or setup vast amounts of equipment will take longer. Additionally, increasing the amount of data center equipment also increases the probability of malfunctioning equipment or miswired equipment. Configuring new pieces of equipment to replace malfunctioning equipment in a timely manner will increase data center efficiency. Also, as greater amounts of new equipment are used to expand existing data centers, the ability to quickly configure new pieces of equipment to increase data center capacity will become more desirable. As data centers become larger the amount of information to review to determine that equipment is configured and connected properly becomes larger and more time consuming to analyze.

SUMMARY

This Summary is provided to introduce the simplified concepts for address configuring and troubleshooting of servers and other data center equipment. The methods and systems are described in greater detail below in the Detailed Description. This Summary is not intended to identify essential features of the claimed subject matter nor is it intended for use in determining the scope of the claimed subject matter.

Data centers, networked environments, or entities can be configured in many different ways in order to provide data to end-users or to other servers within the same data center. Configurations or topologies of the data center equipment may be symmetrical or asymmetrical and may include several thousand to hundreds of thousands or even millions of pieces of equipment arranged in various hierarchies. An intended designed configuration, or "blueprint configuration," may be used to guide the construction of the data center or it may be derived after construction based on the understanding of the equipment connections of data center administrators. The blueprint configuration may include a node for each piece of equipment and the connections between each of the nodes to indicate how the nodes should be connected to each other. After all the nodes are connected together, a physical configuration may be collected electronically to identify each of the nodes and their actual relative connections to each other. Given these two large data sets of information, a network administrator may be able to determine a one-to-one mapping between the blueprint and physical datasets to determine if the data center is properly arranged and connected.

One way to efficiently resolve or to troubleshoot the arrangement, connections, and functionality between thousands of pieces of interconnected equipment is by abstracting the one-to-one mapping of the data sets as a graph isomorphism problem using graph theory. For example, the blueprint topology and the physical topology of the data center could be resolved into graphs which would enable the use of graph theory to determine whether the nodes of the graphs are isomorphic. If the graphs are isomorphic then the intended design of the data center (represented by the blueprint graph) matches the actual arrangement of the data center (represented by the physical topology graph).

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This disclosure relates to generic and automatic Data center Address Configuration (DAC). The system includes an automatically generated blueprint topology which defines the connections of servers and switches labeled by logical identifiers (ID), (e.g., Internet Protocol (IP) addresses) and a physical topology of the connections, servers, and switches labeled by device IDs (e.g., Media Access Control (MAC) addresses). IP addresses and MAC addresses are presented here for example, and not limitation. The DAC abstracts the device-to-logical ID mapping to a graph isomorphism problem and solves it with low time-complexity by leveraging attributes of the data center network topologies. The DAC system is intended to be applicable to various network architectures, topologies, and address schemes. Accordingly, symmetrical or asymmetrical networks using various address schemes may be configured and troubleshot with minimal human intervention using the DAC. The type of network architectures may include, but are not limited to, BCube, Fat Tree, VL2, and DCell. The DAC deals with all of the address configuration features such as blueprint topology interpretation or calculation, physical topology collection, device-to-logical ID mapping, logical ID dissemination, and malfunction detection.

Example Data Center Topology

Figure 1:
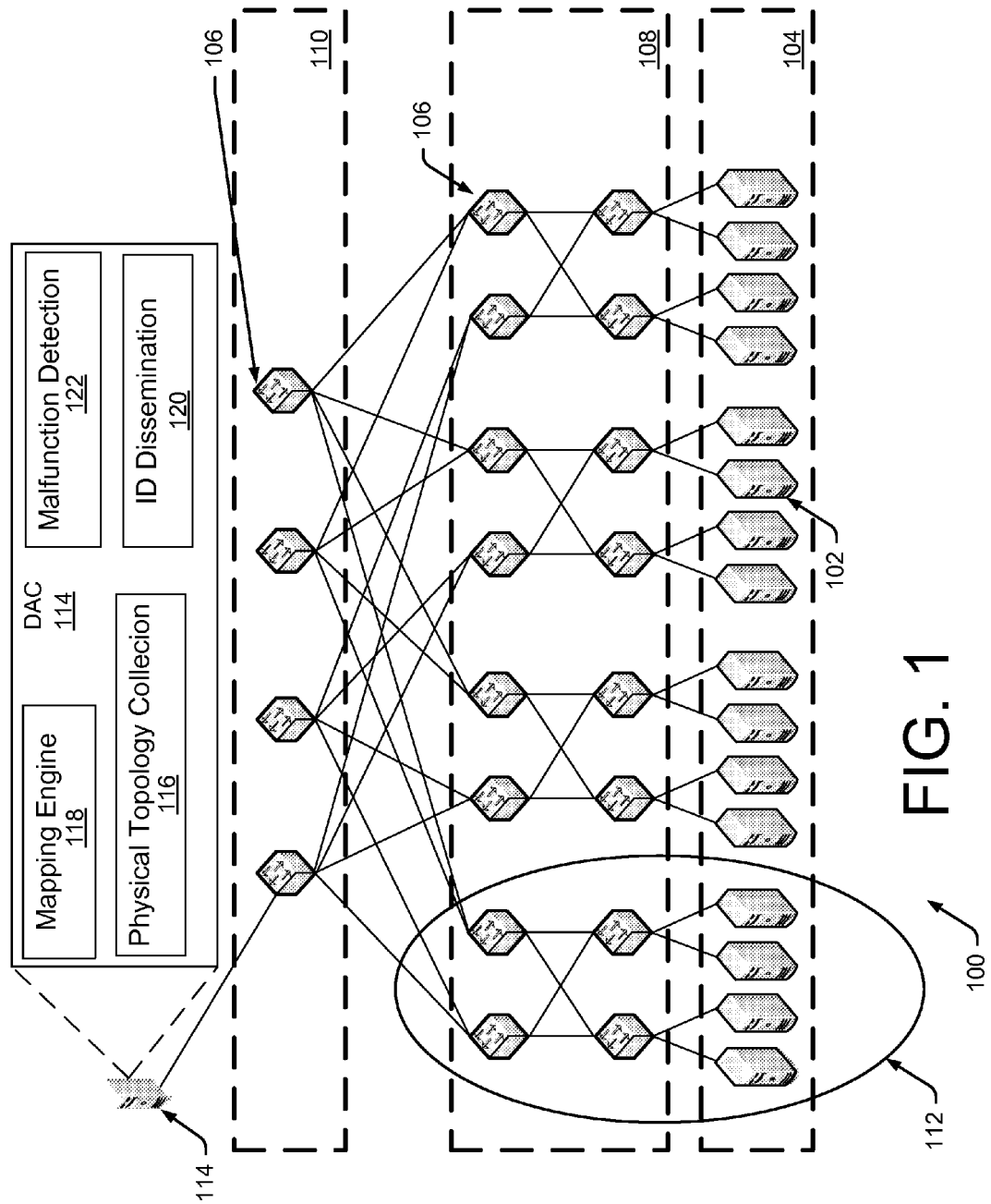
FIG. 1 is a schematic diagram of a representative arrangement of a data center that includes an illustrative computing device that may be used to configure the data center according to one embodiment.

FIG. 1 is an illustration of a representative data center 100 connected to a DAC 114. Data center 100 illustrates a representative hierarchy and connectivity of electronic equipment that are arranged to provide cloud computing, or any other type of IT services. Data centers may be arranged in many different ways and may include many more types of electronic equipment than shown in FIG. 1. Accordingly, data center 100 is provided here for purposes of explanation and is not intended to limit the scope of the claims. In this embodiment, individual servers 102 are arranged in a hierarchy 104 and are arranged at a lowest level of the data center 100. Each of the servers 102 may be connected to one or more switches or other electronic devices. In this embodiment, the servers 102 are connected to one or more switches 106 located in a first switch hierarchy 108. Within the first switch hierarchy 108, the switches 106 may be arranged in many different ways and may include other electronic devices not presently shown in FIG. 1. The data center 100 may also include physical cells that may be chosen for mapping analysis, the physical cell may include a portion of the data center or the data center in its entirety. In this embodiment, the physical cell 112 is limited to a collection of switches 106 and servers 102 for purposes of explanation only. A second switch hierarchy 110 is illustrated above the first switch hierarchy 108 and connects the various physical cells 112 to each other. The connections and device ID assignments associated with each of the devices in FIG. 1 will be described in the discussion of FIG. 3 below.

The DAC 114 is shown to include a Physical Topology Collection Component 116, a Mapping Engine 118, an ID Dissemination Component 120, and a Malfunction Detection Component 122. The components of the DAC 114 will be described in greater detail below. Although DAC 114 is shown as being separate from data center 100, in alternative embodiments, one of the devices in data center 100 may perform the role of the DAC 114. The DAC 114 may be configured as any suitable computing device capable of implementing a network auto configuration system. By way of example and not limitation, suitable computing devices may include personal computers (PCs), servers, or any other device using memory and a processor. The DAC 114 may be implemented as appropriate in hardware, software, firmware, or combinations thereof. Software or firmware implementations of the DAC 114 may include computer- or machine-executable instructions written in any suitable programming language to perform the various functions described. Memory located with the DAC 114 may store program instructions that are loadable and executable on the processor 104, as well as data generated during the execution of these programs. Depending on the configuration and type of computing device, the memory may be volatile (such as random access memory (RAM)) and/or non-volatile (such as flash memory, etc.). The disk drives and their associated computer-readable media may provide non-volatile storage of computer readable instructions, data structures, program modules, and other data for the computing devices. In some implementations, the memory may include multiple different types of memory, such as parameter random access memory (PRAM), and at least one other type of memory, such as static random access memory (SRAM), dynamic random access memory (DRAM), or read only memory (ROM).

Figure 2:
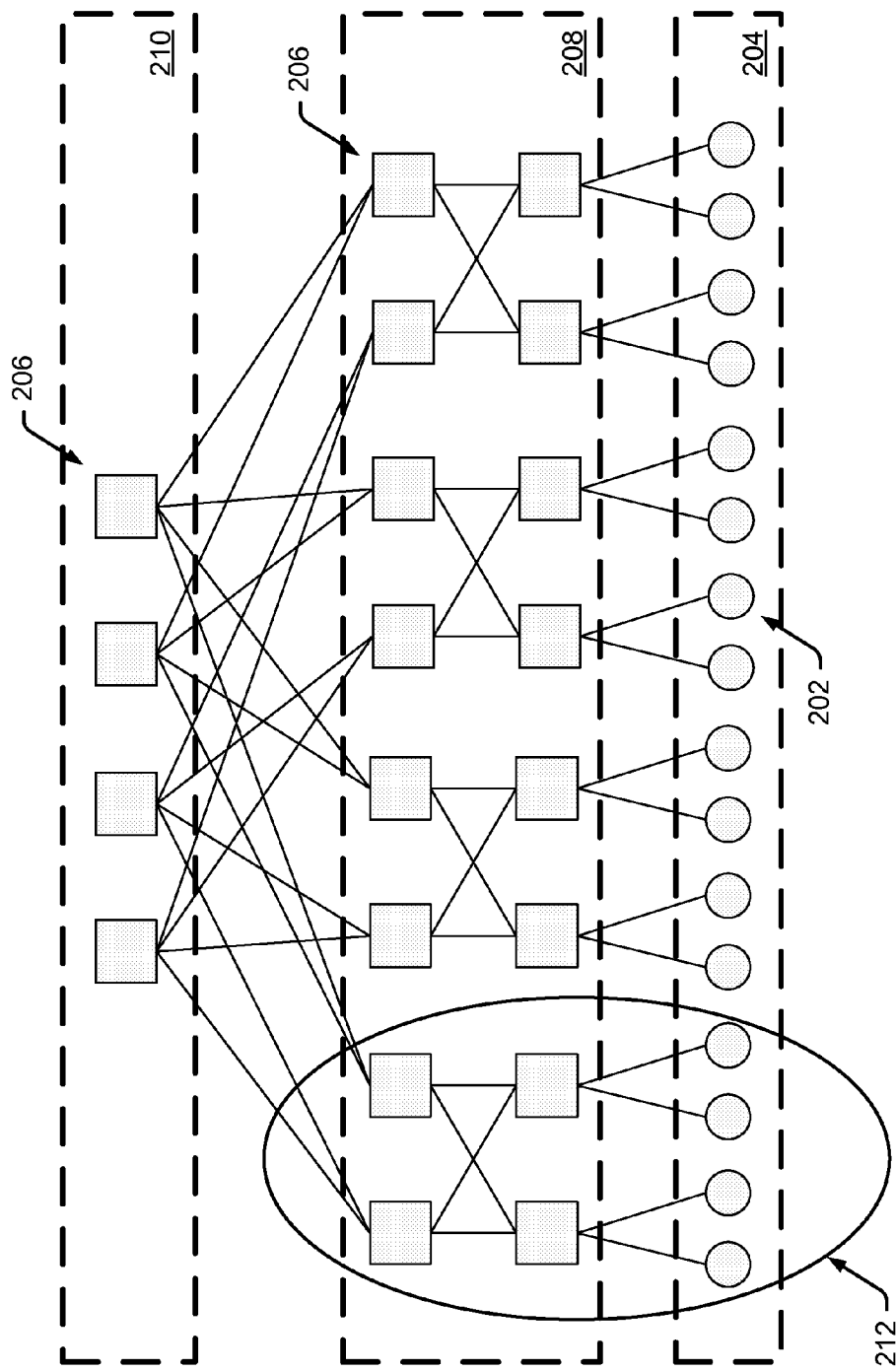
FIG. 2 is a schematic diagram representative of a blueprint topology of a data center which may be used according to illustrative methods described herein.

FIG. 2 is an illustration of a blueprint 200 of data center 100. The blueprint 200 includes a server hierarchy 204, a first switch hierarchy 208, a second switch hierarchy 210, and a blueprint cell 212, which reflect the intended design of data center 100. The server hierarchy 204 includes servers 202, the first and second switch hierarchies include switches 206, and the lines between each of the devices in FIG. 2 define the intended arrangement of the devices relative to each other. In one embodiment, the blueprint 200 is based on the blueprints used to guide the construction of the data center 100. However, the blueprint 100 may be any document that is created to reflect the current arrangement of the data center 100 based on the understanding and knowledge of the network administrators of the data center 100. The blueprint 200 may be stored in paper or electronic form. In this embodiment, the blueprint cell 212 is limited to a collection of switches 206 and servers 202 for purposes of explanation only. The connection and logical ID assignments associated with each of the devices below will be described in the discussion of FIG. 3 below.

Example Graphs & Topology Collection

Figure 3:
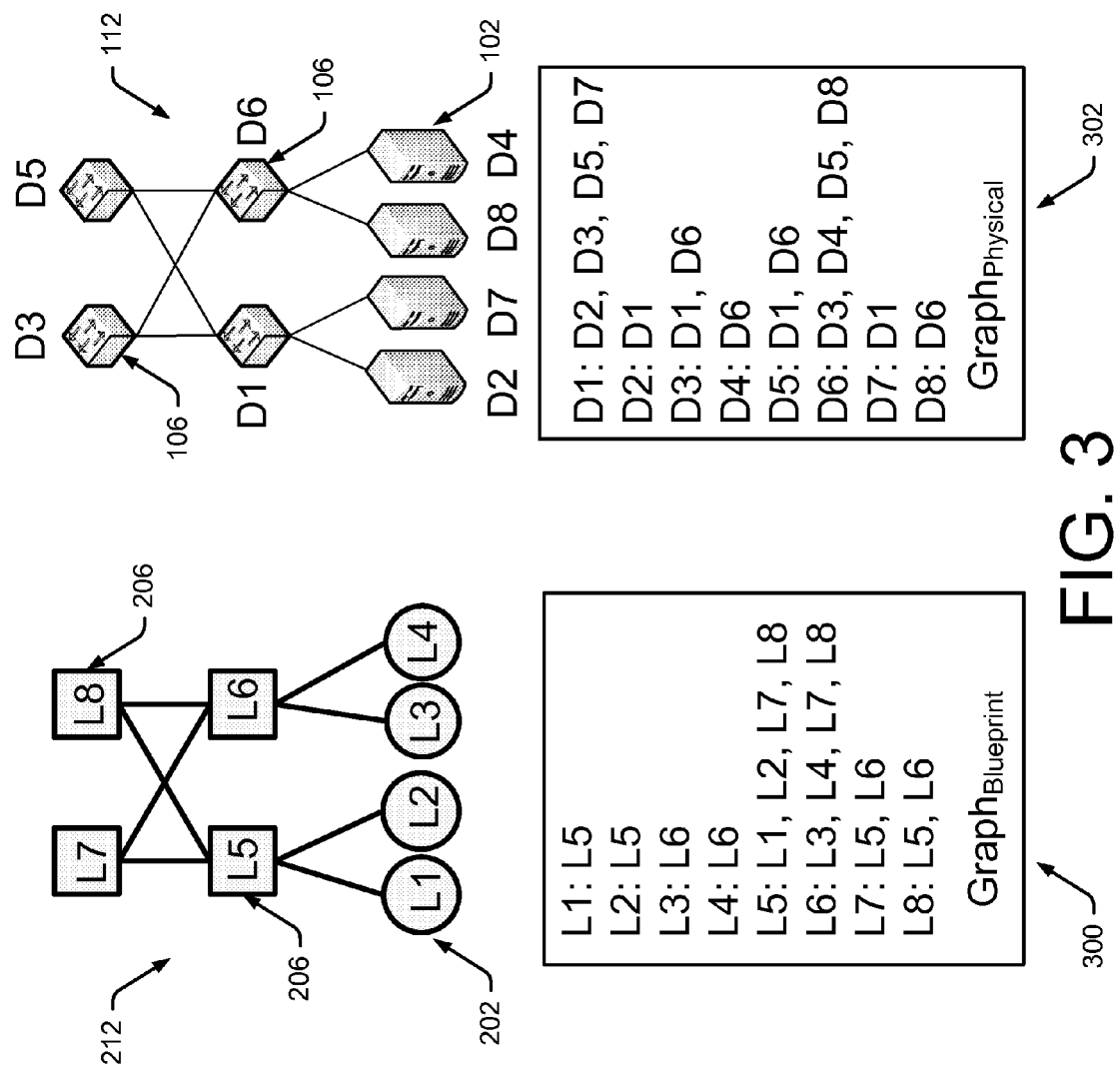
FIG. 3 is a schematic diagram representative of a blueprint cell and a physical cell and their respective graphs according to illustrative methods described herein.

FIG. 3 includes several illustrations used for explaining the identification and location methodology to enable the use of graph theory to implement the auto configuration and malfunction detection of data center 100. FIG. 3 includes break-out illustrations of the physical cell 112 from the data center 100 and the blueprint cell 212 from the blueprint 200 along with corresponding graph representations (blueprint topology graph 300 and physical topology graph 302).

Blueprint cell 212 includes the servers 202 and the switches 206 as arranged in blueprint 200. Additionally, each of the devices is assigned a logical ID designation. Although the logical IDs may also convey topographical information of the network structure, they are not required to provide topographical information as in this example. The logical IDs can be in any format, but each device has its own unique logical ID.

In this embodiment, the four servers are identified by their logical IDs: L1, L2, L3, and L4 and the four switches are identified by the logical IDs: L5, L6, L7, L8. Servers L1 and L2 are connected to switch L5 and servers L3 and L4 are connected to switch L6. Switch L5 is connected to switches L7 and L8. Switch L6 is also shown to connect to switches L7 and L8. While most data center architectures, like BCube, DCell, Ficonn, and Portland, use port based logical IDs, for purposes of brevity, the DAC is introduced and evaluated as a device based deployment. Although the DAC can handle the port based scenario by simply considering each port as a single device and treating a device with multiple ports as multiple logical devices. At the most basic level, the blueprint 200 may impart device identification for the relevant devices and the interconnection of the devices. Note that it is possible for a blueprint 200 to label port numbers and define how the port of neighboring devices are connected, but the DAC does not require such information. However, knowing the neighbor information of the devices is important to create a blueprint topology graph 300, which will be discussed in greater detail below.

Physical cell 112 includes the servers 102 and the switches 106 as arranged in the data center 100. Additionally, each of devices is assigned a device ID designation. In this embodiment, the four servers are D2, D7, D8, and D4. The counterparts in the blueprint cell 212 are as follows: L1:D2, L2:D7, L3:D8, and L4:D4. In short, the blueprint cell servers 202 are representations of the actual data center servers 102. Similarly, the switches D2, D3, D5, and D6 are represented by the switches L5, L6, L7, and L8 in the blueprint cell 212 and the counterpart pairings are as follows: L5: D1, L6: D6, L7:D3, and L8: D5. Generally, the number of devices in the blueprint 200 are intended to correspond to the number of devices in the data center 100 to enable the application of graph theory concepts.

Graph theory concepts as understood by a person of ordinary skill in the art and as discussed in "Generic and Automatic Address Configuration for Data Center Networks," pertain to mathematical structures used to model pair wise relationships between objects belonging to a certain collection, the objects being connected to each other in some manner. See, "*Generic and Automatic Address Configuration for Data Center Networks*," Computer Communication Review, Vol. 40, No. 4, October 2010, pp. 39-51. One graph theory concept is graph isomorphism which dictates that two graphs, say $G_1=(V_1, E_1)$ and $G_2=(V_2, E_2)$, such that two vertices or nodes (u,v) of $E_1$ are adjacent in $G_1$ if and only if f(u) and f(v) are adjacent in $G_2$. In this example, V denotes an identifier of an object in graph G, and E denotes the vectors or connections associated with V that indicates how V may be connected to other objects in the graph G. Graphs will typically identify the object in a graph as well the connections, or adjacencies, to other objects within the same graph. In other words, graph isomorphism is a mathematical technique to verify that two graphic structures are organized in a similar manner, such that each object in one graph has a corresponding counterpart in another graph and that the connections associated with each of those objects are also similar.

In FIG. 3, the blueprint graph 300 is a graph of blueprint cell 212. The nodes of blueprint cell 212 are identified in the left column of blueprint graph 300 (L1-L8) and the adjacencies or connections of those nodes are identified in the right hand column of the blueprint graph 300. The connections in the right hand column indicate which other nodes may be connected to each individual node in a cell. For example, L1 is connected to L5 and L6 is connected to L3, L4, L7, and L8. Although blueprint cell 212 provides one graphical representation of blueprint graph 300, the cell 212 may be arranged in any manner that complies with connection information provided in a network blueprint. The node identifiers L1-L8 may be in any format or manner of identification. A non-limiting example may be a port number for each device. The port number identifies the node in the data center and in certain embodiments the port number may also impart location information related to the node. However, using the node identifier to impart location information is not required in order to be used by the DAC. As noted above, the blueprint topology graph 300 may be pre-computed and provided to the DAC and may represent the arrangement or design of the data center as intended by the designers or administrators of the data center 100.

Also, in FIG. 3, is an example of a physical graph 302 of physical cell 112. Again, the left hand column of graph 302 represents a device identifier and the right hand column details the types of connections associated with each device. For example, device D1 is connected to D2, D3, D5, and D7, and device D8 is connected to D6. Data for the physical graph may be collected electronically after the data center has been brought online. In one embodiment, the DAC 114 via the Physical Topology Component 116 uses a communication channel over the data center 100 to collect physical topology information (device identifiers and device connections). For example, a Communication channel Building Protocol (CBP) builds a communication channel via a layered spanning tree with the root being the DAC at level 0 and its children (data center devices) are level 1, and so on and so forth, until all the levels of the data center are included in the communications channel.

In one embodiment of the CBP, each network device sends Channel Building Messages (CBM) periodically to all of its interfaces. Neighbor nodes are discovered by receiving CBMs. Each node sends its own CBMs, and does not relay CBMs received from other nodes. To speed up information propagation, a node sends a CBM if it observes changes in neighbor information. A checking interval may be used to reduce the number of CBM messages by limiting the minimal interval between two successive CBMs. The DAC sends out its CBM with its level marked 0 (zero), and its nearest neighbor nodes correspondingly set their levels to 1, and the next nearest neighbor nodes set their levels to 2. This procedure continues until all nodes get their respective levels, representing the number of hops from that node to the DAC. A node randomly selects a neighbor node as its parent if that node has the lowest level among its neighbors, and claims itself as those nodes's child by its next CBM.

Once a communications channel is established, the DAC 114 may implement a Physical topology Collection Protocol (PCP) that establishes the connection information between each node of the data center. In one embodiment, the connection information is propagated bottom-up from the leaf devices to the DAC layer-by-layer. The device ID for each node can be any form of identification that may be electronically collected. In one embodiment, the device IDs for graph 302 may be MAC addresses. For a device with multiple MAC addresses the lowest one may be used to identify the device for mapping purposes.

In one embodiment of the PCP, each node reports its node device ID and all its neighbors to its parent node. After receiving all information from its children, an intermediate node merges them (including its neighbor information) and sends them to its parent node. This procedure continues until the DAC receives the node and link information of the entire data center 100.

Example One-to-One Mapping

Figure 4:
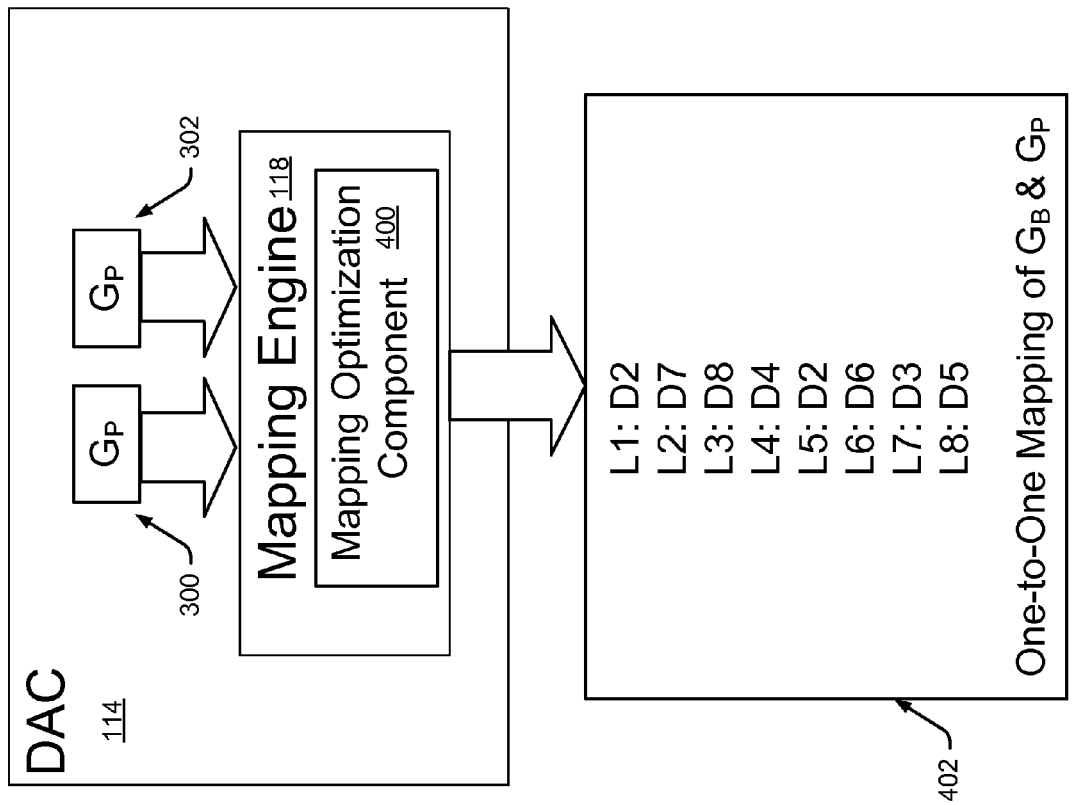
FIG. 4 is a schematic diagram representative of a computing device that performs the illustrative mapping methods described herein.

Turing to FIG. 4, a mapping engine 118 of the DAC 114 receives blueprint graph 300 and physical graph 302 as inputs, and uses a mapping optimization component 400 to output a one-to-one mapping of the graphs. In short, the mapping algorithm may determine if each node of both graphs share objects that are arranged in a similar manner such that the principles of graph isomorphism described above are detected. The details of an iterative approach to generate the one-to-one mapping will be described in greater detail below. However, for the time being, comparing the structures of cells 112 and 212 and the output results 402, at a high level the mapping optimization component 400 determines if a one-to-one relationship exists between two graphs. Specifically, a one-to-one mapping means each node and the orientation or location of each node within its respective graph are found to be isomorphic, or that the structures of the two graphs are substantially similar to each other in structure or organization. As shown in FIG. 3, the intended design represented by the blueprint cell 212 is similar or substantially similar in the number of nodes and the arrangement of the connections between the nodes to the electronic data collected from the data center 100 to create the physical cell 112. On a broader scale, this one-to-one mapping technique may be applied to the data center 100 as a whole, such that the one-to-one mapping could be performed for all the devices in the data center 100.

The mapping optimization component 400 adopts an iterative approach to solve the graph isomorphism problem applied to data centers. The mapping optimization component 400 uses the techniques of decomposition and refinement to decompose and refine (or split) blueprint graph and physical graph to identify a one-to-one mapping of the graphs, as shown in the output 402 of the mapping optimization component 400. Note that the logical IDs of the blueprint cell 212 are shown to map the devices IDs of physical cell 112 in a one-to-one manner based on their similar orientations within their respective cell structures. This mapping process will be described in greater detail with reference to FIG. 5.

Figure 5:
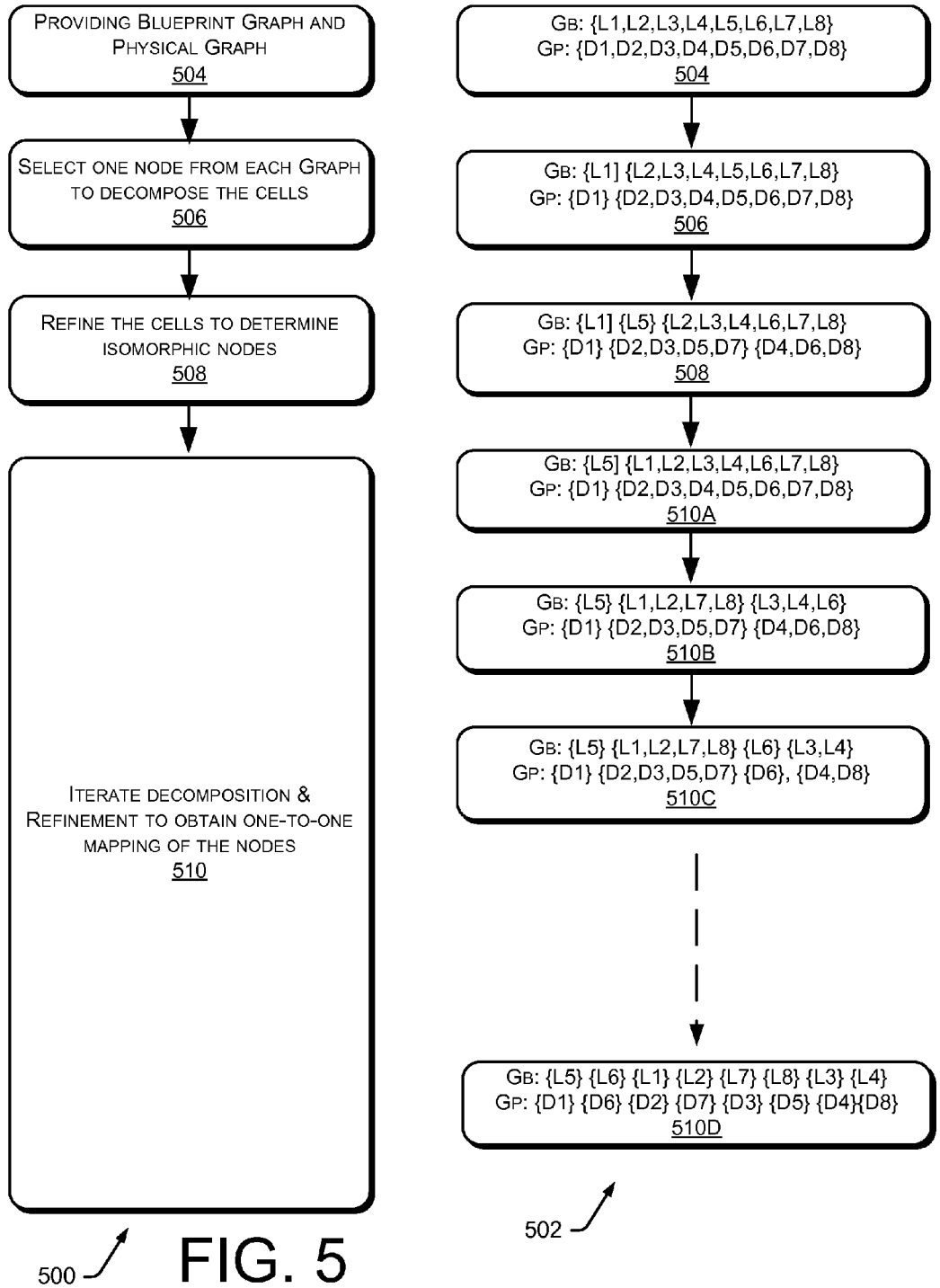
FIG. 5 is a flowchart of an example of the decomposition and refinement method described herein.

FIG. 5 provides a side-by-side explanation of the iterative mapping process performed by the mapping optimization component 402. Method 500 provides the acts and method 502 provides an illustration of the act as they are applied to blueprint graph 300 and physical graph 302. Note that the corresponding acts include common numeral notations. For example, act 1 of methods 500 and 502 are notated by number 504 in each method, and so on and so forth.

At 504, the blueprint graph 300 and physical graph 302 are provided to the mapping optimization component 400. As noted above, the blueprint graph 300 is provided previously to the DAC and reflects the intended design of the data center 100. Also, the Physical Topology Component 116 using the CBP and PCP techniques described above collects the physical graph 302 and provides it to the mapping optimization component. In this embodiment, L1-L8 are nodes of blueprint cell 212 and D1-D8 are nodes of physical cell 112.

At 506, decomposition begins with selecting a pair of corresponding non-singleton cells from blueprint graph 300 and physical graph 312, and then selecting a pair of nodes to decompose the selected cells. In this embodiment, the non-singleton cells are {L1-L8} and {D1-D8}, and the pair of nodes selected to decompose the cells are L1 and D1. Hence, the decomposed cells are {L2-L8} and {D2-D8} as shown in 506. L1 and D1 may also be termed as inducing cells while {L2-L8} and {D1-D8} are termed targeted cells. The targeted cells are targeted for refinement by the inducing cells.

Next, at 508, the cells are refined to determine which nodes are corresponding nodes. In graph theory isomorphisc division may be determined by dividing target cells by inducing cells to compare if the number of connections associated with each object are same. If so, the cells are divided isomorphically. In this illustrative example, D1 and L1 are selected as inducing cells and the remaining cells in each graph are the target cells (L2-L8 and D2-D8). The target cells are simultaneously divided by the inducing cells. However, in this embodiment, the isomorphic division fails since {D2-D8} has four elements (D2, D3, D5, D7) with one connection to D1 and three elements with zero connections (D4, D6, D8) to D1; while {L2-L8} has one element (L5) with one connection to L1 and seven elements (L3, L4, L6-L8) with zero connections to L1. Therefore, {L2-L8} and {D2-D8} are not divided isomorphically and L1 can not be mapped to D1. Hence, another pair of inducing cells will be chosen for the next iteration.

At 510, the inducing pair selection, decomposition, and refinement are iterated until one-to-one mappings are found. The details of the iteration process are explained via acts 510A-510D.

At 510A, jumping ahead in the iteration process, D1 and L5 are selected as the inducing cells. Hence, physical graph 302 is decomposed into {D1} and {D2-D8} and blueprint graph 300 is decomposed into {L5} and {L2-L4, L6-L8}, respectively.

At 510B, the inducing cells (D1 and L5) are divided or refined into their respective targeted cells (D2-D8 or L2-L4, L6-L8). L5 is found to have four elements (L1, L2, L7, L8) with one connection and three elements (L3, L4, L6) with zero connections. As noted above, D1 was found to have four elements (D2, D3, D5, D7) with one connection to D1 and three elements with zero connections (D4, D6, D8) to D1. Hence, D1 and L5 can be mapped to each other at this round.

At 510C, two more nodes are selected from the remaining target cells to iterate the decomposition and refinement acts for the remaining nodes. The two newly selected nodes are the new inducing cells and are used to split all other corresponding non-singleton cells. In this embodiment, L6 and D6 are chosen as inducing cells from {L3, L4, L6} and {D4, D6, D8} respectively. L6 and D6 are used to refine or split target cells {L3, L4} and {D4, D8} respectively. D6 is found to have four elements (D3, D5) with one connection to D6 and three elements with zero connections (D2, D7) to D6. L6 is found to have four elements (L7, L8) with one connection to L6 and three elements (L1, L2) with zero connections to L6. Further L6/D6 have one connection with {L3 L4}/{D4 D8} respectively. Therefore, D1 and L5 can be mapped to each other at this round.

At 510D, after successive iterations modeled on the process described in acts 510A-510C, the nodes are refined down to one-to-one pairings as shown in 514D that are similar to the one-to-one mapping 402 described in FIG. 4. Such recursion continues until either both graphs become discrete, i.e., a one-to-one mapping, or it is determined that a one-to-one mapping does not exist between the graphs.

Figure 6:
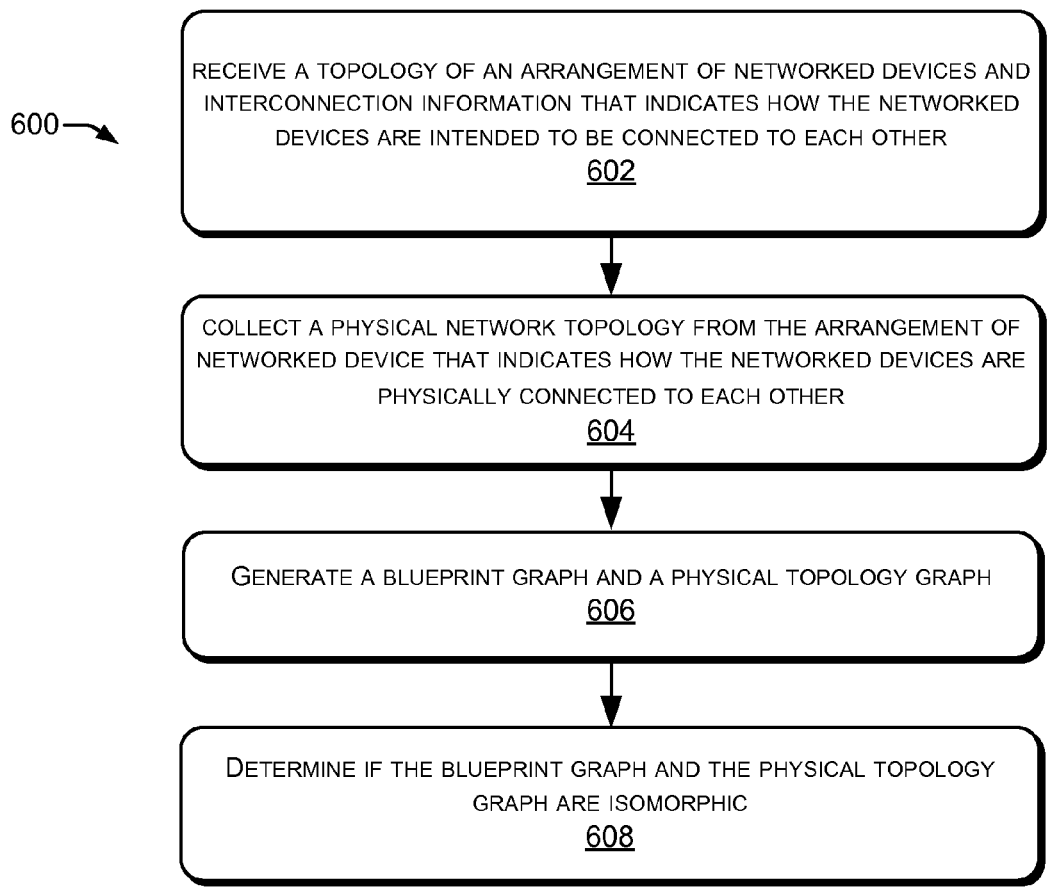
FIG. 6 is a flowchart of an example isomorphism determination method applied to a data center.

In FIG. 6, method 600 broadly explains the mapping function performed by the DAC 114. At 602, the DAC 114 receives a topology of an arrangement of networked devices, the topology being similar to the blueprint 200 as shown in FIG. 2. The topology may also includes a logical ID for one or more of the networked devices and interconnection information that indicates how the networked devices are intended to be connected to each other. As discussed above, the blueprint 200 is a pre-computed topology that represents the intended arrangement of the devices in data center 100. The DAC 114 is configured to receive the blueprint 200 electronically or it may be manually entered into the DAC 114 directly.

At 604, the DAC 114 collects a physical network topology from the arrangement of networked devices, the networked devices being similar to the data center 100. The physical network topology includes a device ID for one or more of the networked devices and connection information of the network devices that indicates how the networked devices are physically connected to each other within data center 100. As discussed above, the device IDs, or MAC addresses, for the data center 100 are collected by the Physical Topology Collection component 116 along with the connection information for each of the devices.

At 606, the DAC 114 generates the blueprint topology graph 300 and physical topology graph 302 as they are described in the remarks to FIG. 3.

At 608, the DAC 114 using the mapping optimization component 400 determines if the blueprint topology graph 300 and the physical topology graph 302 are isomorphic using the decomposition and refinement techniques described in FIG. 5.

Example Iteration Optimization

As with any iterative process, the amount of time to find a solution may be time consuming. However, techniques may be applied to reduce an amount of time needed for the mapping optimization component 402 to find a solution. For example, the iterative process may be completed faster if certain nodes are selected over other nodes based on characteristics associated with the nodes. This disclosure describes using techniques, such as, for example Shortest Path Length Distribution (SPLD), Orbit Filtering, and Selective Splitting to minimize an amount of processing time to find a solution. The three techniques may be applied separately or in various combinations to reduce the amount of iterations performed by the DAC to find one-to-one mappings between the graphs.

Figure 7:
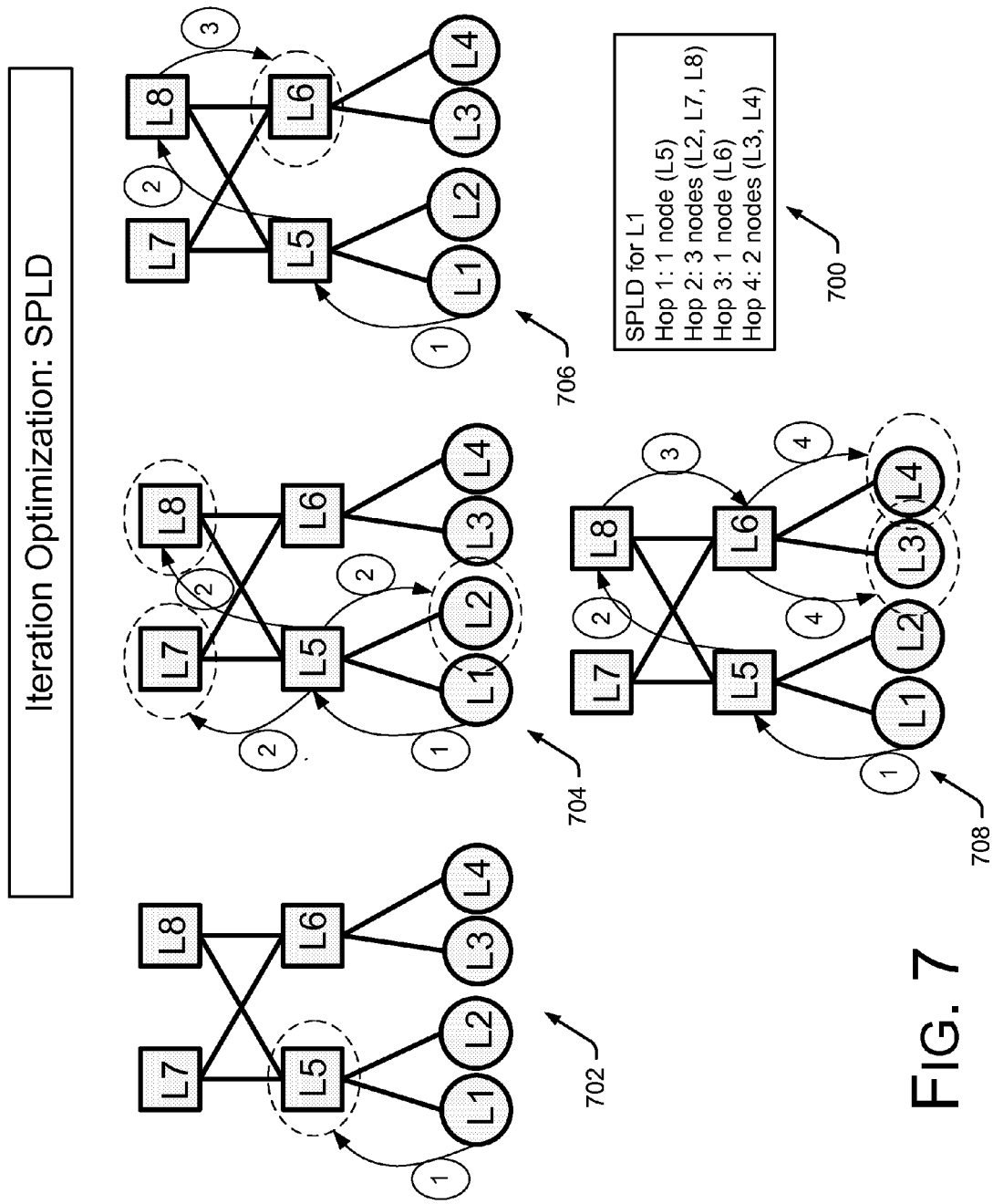
FIG. 7 is a schematic diagram representative of cells used to explain the shortest path length distribution distance.

FIG. 7 provides an explanation of the SPLD technique applied by the mapping optimization component 400 to reduce the number of iterations. As noted above, selecting certain nodes over other nodes may reduce the amount of time to determine if blueprint graph and physical graph are isomorphic. SPLD is the distribution of distances between the selected node and all other nodes in the graph. In one embodiment, the SPLD measurement is the distribution of the number of nodes per hop away from the selected node. That is, each hop represents one link away from the selected node and the link may or may not be representative of a physical distance. FIG. 7 provides several illustrations using node L1 of blueprint cell 212 to explain how the SPLD distribution of distances are determined Node L1 of Blueprint cell 212 is used for purposes of explanation only, and the principles explained may be applied to the entire blueprint 200 or the data center 100. The unit distance illustrated by FIG. 7 is the hop, the hop being a link between one node and a neighboring node. This example is but one example of an SPLD. Other techniques may be used to determine the relative position of one node to other nodes in a data center in order to provide a distribution of distances for each node.

Table 700 provides a summary of the SPLD of node L1 of blueprint cell 212. Hop 1 from node L1 includes node L5, therefore Hop 1 includes one node in this example. An illustration of this determination is shown in blueprint cell 702. The arrow starting at L1 and pointing to L5 represents Hop 1. Table 700 notes that Hop 2 from L1 includes nodes L2, L7, and L8. Blueprint cell 704 illustrates the Hop 2 determination that shows all the nodes located within two hops of L1, please note the three arrows from L5 that trace all the connections associated with L5. Note that the Hop 2 starts at L5 where Hop 1 ended and Hop 2 includes all the neighbor nodes of L5. Next, blueprint cell 706 illustrates Hop 3 of table 700. In this scenario, Hop 3 includes the neighbor nodes of the Hop 2 nodes. In this instance, L8 has a neighbor node (L6) that is an additional or third hop away from node L1. Nodes L2 and L7, in this example, are not connected to any other nodes other than L6, that are an additional hop away from L1. Hence, Hop 3 includes one node, L6, which is three hops from node L1. Lastly, table 700 indicates that Hop 4 includes two nodes, L3 and L4. Note that L3 and L4 are the only neighbor nodes of L6 that are fours hops away from node L1. Hop 4 is illustrated by blueprint cell 708. The SPLD includes the distribution of the number of hops from a root node, such as L1, and the number of nodes at each of the hops. Hence, the SPLD for L1 is 1:1, 2:3, 3:1, and 4:2 or Hop 1 includes one node, Hop 2 includes three nodes, Hop 3 includes one node and Hop 4 includes two nodes.

Applying the SPLD technique to the acts in FIG. 5, the original selection of D1 and L1 would not have occurred since D1 and L1 do not have similar SPLDs. In contrast, iterating the selection process using the SPLD technique, the first nodes that would have been selected as inducing cells would have been D1 and L5 since they have similar SPLDs. L2-L4 would not have been selected either since they do not have SPLDs similar to D1.

Figure 8:
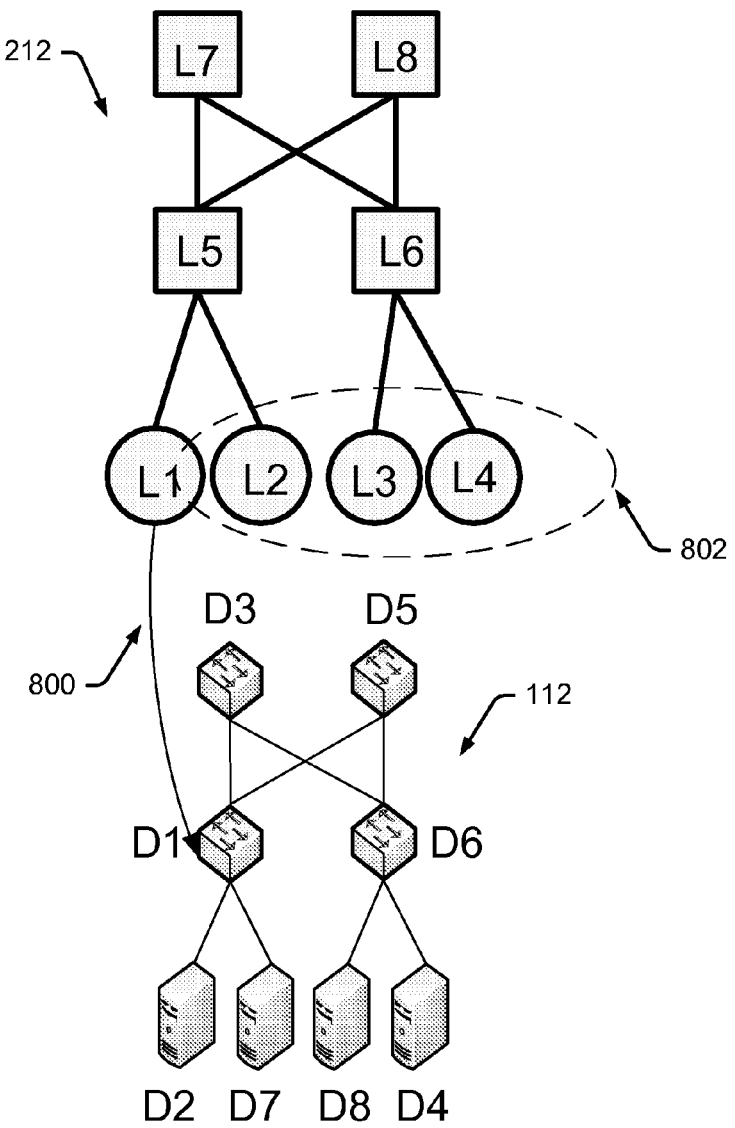
FIG. 8 is a schematic diagram representative of an example of orbit filtering.

FIG. 8 includes an illustration of physical cell 112 and blueprint cell 212 and shows, by example, how orbits are classified for connected objects. A subset of nodes are in the same orbit if there exists an automorphism that maps to the same nodes. An automorphism of a graph is a graph isomorphism within itself, i.e., a mapping from the vertices of the given graph blueprint graph back to the vertices of blueprint graph such that the resulting graph is isomorphic with the blueprint graph. During the iterative mapping optimization, common nodes that are in the same orbit may provide the same result if selected to determine if two nodes are isomorphic. Simply stated, if two nodes are determined not to be isomorphic then other nodes within the same orbit are not likely to be isomorphic either. Accordingly, iteratively selecting nodes from the same orbit of a non-isomorphic node to compare with the same node would needlessly use computing resources and increase the amount of time to solve the graph problem. Hence, avoiding the iterative selection of nodes within the same orbit will improve the efficiency of the mapping optimization component 402. The orbits for the blueprint graph 300 may be computed prior starting the isomorphism calculations. For example, if L1 and D1 are selected by mapping optimization component 400, as represented by arrow 800, and the nodes are determined to be non-isomorphic. Mapping component 400 will not select nodes that are autoisomorphic to L1 (which in this example are nodes L2, L3, and L4) to compare against node D1 in the next iteration of the mapping process. An example of the Orbit filtering technique can be illustrated using FIG. 8. For example, if L1 and D1 were determined not to be isomorphic then the next iteration of decomposition would not use D1 with L2-L4, since L2-L4 are in the same orbit as L1. The orbit nodes of L1 are highlighted by the ellipsis 802 in FIG. 8. L5 and L6 are in the same orbit and L7 and L8 are part of another orbit.

Selective Splitting is another technique to optimize the mapping process. As described in FIG. 5, refinement uses the inducing cells to split all the other cells. Instead of attempting to split all the cells, Selective Splitting limits the refinement or splitting of cells that are connected to the inducing cell. Hence, the refinement process is not random and it will likely result in performing fewer iterations in order to achieve one-to-one mapping of the cells.

Figure 9:
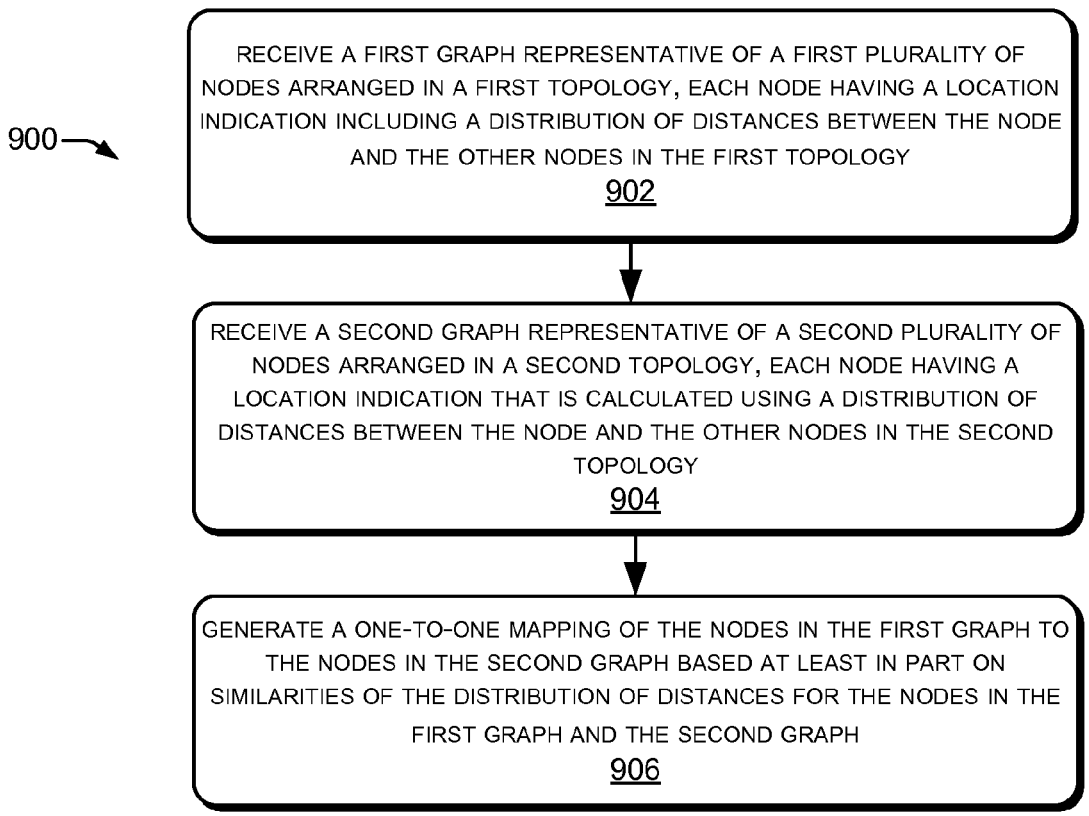
FIG. 9 is a flowchart of a refinement method described herein.

In FIG. 9, method 900 relates to incorporating the SPLD techniques into a mapping method similar to those discussed above. At 902, the mapping optimization component 400 receives a first graph representative of a first plurality of nodes arranged in a first topology with each node having an associated location indication, the indication being a distribution of distances between the node and the other nodes in the first topology. In one embodiment, the distribution of distances is a Shortest Path Length Distance as described above with reference to FIG. 7. Also, blueprint graph 300 described above in FIG. 3 may be indicative of the first graph.

At 904, mapping optimization component 400 receives a second graph representative of a second plurality of nodes arranged in a second topology. Each node having a location indication that is calculated by the mapping optimization component 400, the indication being a distribution of distances between the node and the other nodes in the second topology. In one embodiment, the distribution of distances is a Shortest Path Length Distance as described above with reference to FIG. 7. Also, physical graph 302 described above in FIG. 3 may be indicative of the second graph.

At 906, the mapping optimization component 400 picks a node in the second graph and maps the node to a node in the first graph with the same SPLD. Once the nodes have been mapped, then the decomposition and refinement process described in FIG. 5 is commenced.

Example Logical ID Dissemination

Once the one-to-one mapping is completed, the information is disseminated to the network by the ID dissemination component 120 that uses the PCP protocol and the Logical ID Dissemination Protocol (LDP). The PCP protocol is described above under the Example Graphs & Physical Topology section. The LDP is the reverse of the PCP. The ID dissemination component 120 sends the achieved device-to-logical ID mapping information to all its neighbor nodes, and each intermediate node delivers the information to its children. Since a node knows the descendants from each child via PCP, it can provide the mapping information on a per-child basis and deliver the more specific mapping information to each child.

Example Malfunction Detection

Malfunctions in a data center can be caused by hardware and software failures, or simply human configuration errors. For example, bad or mismatched network cards and cables may cause a malfunction. Also, miswired or improperly connected cables are additional causes of malfunctions.

Malfunction types can be categorized as node, link, and miswiring. A node malfunction occurs when a server or switch is disconnected from the network or does not respond due to hardware or software failures. A link malfunction occurs when a cable or network card is broken or not properly plugged in to a device. A miswiring link occurs when wired cables are different from those in the blueprint. In other words, miswiring means the devices are connected in an unintended manner.

One way of detecting malfunctions is comparing the degrees for each node of the system. The degree of a node being the number of nodes that should be or are connected to a node. For example, in FIG. 2, blueprint cell 212 has eight nodes. Node L1 has only one node connected to it (L5), therefore the degree for L1 is one. L5 has a degree of four since it is connected to four nodes (L1, L2, L7, L8). If a node malfunction has occurred, the degrees of its neighboring nodes are decreased by one, and thus it is possible to identify the malfunction by checking the degree of the neighbor nodes. If a link malfunction occurs, the degrees of the nodes using that link are also decreased by one, making the link malfunction detectable. In contrast, miswiring malfunctions are more complex than the link or node malfunctions. Miswirings can result in malfunctions that can create a degree change and malfunctions that do not result in a degree change.

Figure 10:
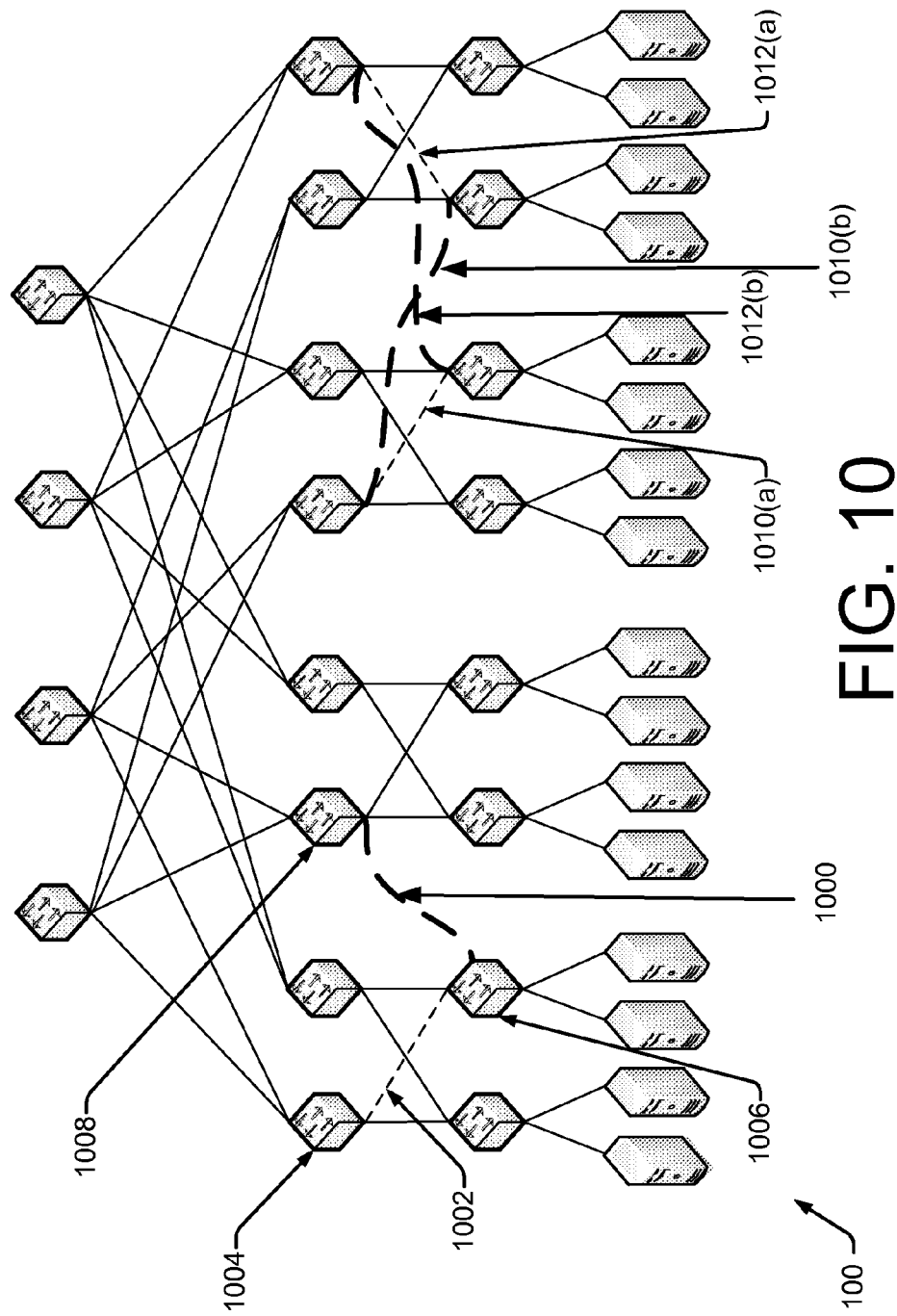
FIG. 10 is a schematic diagram representative of an example of a miswired data center.

As shown in FIG. 10, a degree change miswiring 1000 implies that a node has more or less connections than intended under the data center design plan. For example, the wire 1002 between switch 1004 and switch 1006 has been miswired to connect switch 1004 to switch 1008. In this instance, the degree changes are evident for both switches 1004 and 1008 and are easily detected. However, the miswiring of 1010(a) and 1012(a), as represented by wires 1010(b) and 1012(b), does not cause a degree change to occur for any of the nodes in data center 100. The miswiring of wires 1010(a) and 1012(a) does not change the number of connections between any of the nodes. Therefore, no degree change has occurred and the miswiring 1002 cannot be detected in the same manner as miswiring 1000.

Figure 11:
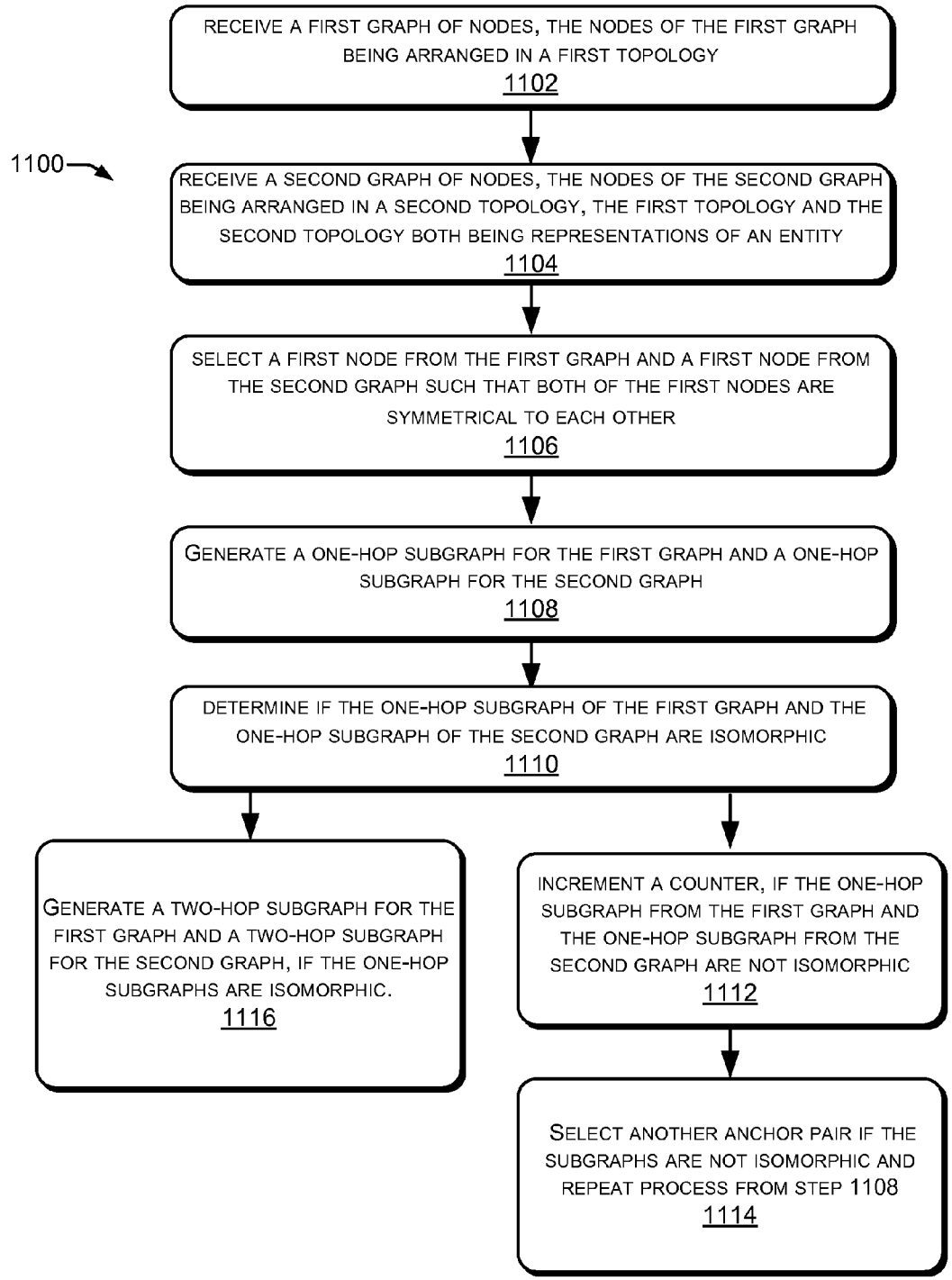
FIG. 11 is a flowchart for a miswiring detection method described herein.

Despite the miswirings, the vast majority of wirings represented by blueprint graph 300 and physical graph 302 are still correct, and that correct information can be leveraged to detect miswirings that do not result in a node degree change. Method 1100 of FIG. 11 provides an example of how to leverage the correct information to detect miswirings that do not result in a node degree change.

At 1102, the mapping optimization component 400 receives a first graph that is representative of the intended design of an entity. In one embodiment, the entity is data center 100 and the first graph is blueprint graph 300.

Next, at 1104, the mapping optimization component 400 receives a second graph that is representative of the actual connections of the same entity in act 1102. In one embodiment, the entity is data center 100 and the second graph is physical graph 302.

At 1106, the mapping optimization component 400 selects one node from the first graph and another node from the second graph, both of which are symmetrical to one another. This pair of points may be called an anchor pair. In one embodiment, the nodes may be symmetrical based upon their relative location within their respective graphs. In another embodiment, the nodes may be deemed symmetrical based on their respective SPLD values. The SPLD values may be determined as described with respect to FIG. 7.

At 1108, the mapping optimization component 400 selects the nodes that are one hop away from each of the anchor nodes. The collection of one-hop nodes may be referred to as the one-hop subgraph. Each graph (blueprint and physical) may include a one-hop subgraph that includes the anchor node and each of the nodes that are one hop away from the respective anchor node, and the respective edges or links between those nodes. In an illustrative example, the blueprint subgraph may include the anchor node L1 shown in blueprint cell 702 in FIG. 7, the one hop nodes from the anchor node, which in this example include node L5 of blueprint cell 702, and the respective edges or links between the aforementioned nodes of the one-hop blueprint subgraph. Also, the physical subgraph may include the anchor node D2 of physical cell 112 in FIG. 8, the one-hop nodes from the anchor node, which in this example include node D1 of physical cell 112, and the respective edges or links between the aforementioned nodes of the one-hop physical subgraph.

At 1110, the mapping optimization component 400 then determines if the one-hop blueprint subgraph and the one-hop physical subgraph are isomorphic. In one embodiment, the isomorphic determination is obtained using the decomposition and refinement process discussed in FIG. 5.

At 1112, if the one-hop blueprint subgraph and the one-hop physical subgraph are not isomorphic, then a counter in the Malfunction Detection component 118 that is associated with each of the nodes in the subgraphs are incremented.

At 1114, another anchor pair is selected from the first and second graphs along with their respective one-hop blueprint subgraph and one-hop physical subgraph if the subgraphs are not isomorphic. Once the second anchor pair is selected the acts described in 1108, 1110, and 1112 are repeated again and again until two more subgraphs are found to be non-isomorphic and their respective counters are incremented.

However, at 1116, if the one-hop blueprint subgraph and the one-hop physical subgraph are determined to be isomorphic, then the mapping optimization component 400 generates a two-hop blueprint subgraph and a two-hop physical subgraph. In an illustrative example, the two-hop blueprint subgraph includes the anchor point L1, the one-hop node L5, the two-hop nodes L2, L7, and L8 as illustrated in blueprint cell 704 in FIG. 7, and the respective edges or links between the aforementioned nodes of the two-hop blueprint subgraph. The two-hop physical subgraph may include the anchor point D1, the one-hop node D5, the two-hop nodes D3, D5, and D7 as illustrated in physical cell 112 in FIG. 8, and the respective edges or links between the aforementioned nodes of the two-hop physical subgraph. This process of creating additional subgraphs that are additional hops (e.g., three-hop, four-hop . . . etc.) away from the anchor pairs continues until two non-isomorphic subgraphs are found. Then a counter for each of those subgraph nodes is incremented, similar to the manner described in act 1112. After the counter is incremented a new anchor pair is selected and the acts, as described in 1110, starts again.

The number of anchor pairs selected will vary and will be dependent upon how many pairs are needed to provide an accurate assessment of miswirings. At the end of the process, the nodes that have the highest counters should be investigated first for miswirings.

CONCLUSION

Although the embodiments have been described in language specific to structural features and/or methodological acts, is the claims are not necessarily limited to the specific features or acts described. Rather, the specific features and acts are disclosed as illustrative forms of implementing the subject matter described in the disclosure.

What is claimed is:

1. One or more computer-readable storage devices storing computer-executable instructions, that when executed by a processor, configure the processor to perform acts comprising:
   receiving a first graph of nodes, the nodes of the first graph being arranged in a first topology;
   receiving a second graph of nodes, the nodes of the second graph being arranged in a second topology, the first topology and the second topology both being representations of an entity;
   selecting a first node from the first graph and a first node from the second graph, the first node from the first graph and the first node from the second graph being a first anchor pair;
   determining that the first node from the first graph and the first node from the second graph are symmetrical to each other;
   generating a one-hop subgraph of the first graph and a one-hop subgraph of the second graph, the one-hop subgraph of the first graph comprising at least nodes that are a single connection link from the first node of the first graph, and the one-hop subgraph of the second graph comprising at least nodes that are a single connection link from the first node of the second graph;
   determining if the one-hop subgraph from the first graph and the one-hop subgraph from the second graph are isomorphic; and
   if the one-hop subgraph of the first graph and the one-hop subgraph of the second graph are not isomorphic, incrementing counters that are associated with the nodes of the one-hop subgraph of the first graph and incrementing counters associated with the nodes of the one-hop subgraph of the second graph.

2. The one or more computer-readable storage devices of claim 1, wherein the one-hop subgraph of the first graph further comprises the first node of the first graph and one or more links between any two nodes in the one-hop subgraph of the first graph, and wherein the one-hop subgraph of the second graph further comprises the first node of the second graph and one or more links between any two nodes in the one-hop subgraph of the second graph.

3. The one or more computer-readable storage devices of claim 2, the acts further comprising, if the one-hop subgraph of the first graph and the one-hop subgraph of the second graph are not isomorphic, and after the incrementing:
   selecting a second anchor pair from the first graph and the second graph.

4. The one or more computer-readable storage devices of claim 2, the acts further comprising generating a two-hop subgraph of the first graph and a two-hop subgraph of the second graph, if the one-hop subgraph of the first graph and the one-hop subgraph of the second graph are isomorphic, the two-hop subgraph of the first graph comprising the first node of the first graph, nodes that are within two connection links from the first node of the first graph, and one or more links between any two nodes in the two-hop subgraph of the first graph, and the two-hop subgraph of the second graph comprising the first node of the second graph, nodes that are within two connection links from the first node of the second graph, and one or more links between any two nodes in the two-hop subgraph of the second graph.

5. The one or more computer-readable storage devices of claim 1, wherein the first node of the first graph and the first node of the second graph are symmetrical to each other when both of the nodes have a same location within their respective topologies.

6. The one or more computer-readable storage devices of claim 1, wherein:
   nodes of the first topology are linked to one or more other nodes of the first topology and each node of the first topology has a distribution of distances between itself and the one or more other nodes of the first topology; and
   nodes of the second topology are linked to one or more other nodes of the second topology and each node of the second topology has a distribution of distances between itself and the one or more other nodes of the second topology.

7. The one or more computer-readable storage devices of claim 6, wherein the first node of the first graph and the first node of the second graph are symmetrical when the distribution of distances associated with the first node of the first graph is the same as the distribution of distances associated with the first node of the second graph.

8. The one or more computer-readable storage devices of claim 7, wherein the distribution of distances between nodes is measured by a number of hops between nodes that are connected to each other in their respective topologies.

9. The one or more computer-readable storage devices of claim 1, wherein the entity is a network of electronic devices.

10. A method comprising:
    receiving a first graph of nodes, the nodes of the first graph being arranged in a first topology;
    receiving a second graph of nodes, the nodes of the second graph being arranged in a second topology;
    selecting, by a processor, a first node from the first graph and a first node from the second graph, the first node from the first graph and the first node from the second graph being symmetrical to each other;
    generating, by the processor, a one-hop subgraph of the first graph and a one-hop subgraph of the second graph, the one-hop subgraph of the first graph comprising at least the first node of the first graph and nodes that are a single connection link from the first node of the first graph, and the one-hop subgraph of the second graph comprising at least the first node of the second graph and nodes that are a single connection link from the first node of the second graph;
    determining, by the processor, if the one-hop subgraph from the first graph and the one-hop subgraph from the second graph are isomorphic; and
    if the one-hop subgraph of the first graph and the one-hop subgraph of the second graph are not isomorphic, incrementing counters that are associated with the nodes of the one-hop subgraph of the first graph and incrementing counters associated with the nodes of the one-hop subgraph of the second graph.

11. The method of claim 10, further comprising, if the one-hop subgraph of the first graph and the one-hop subgraph of the second graph are not isomorphic, and after the incrementing, selecting a second node from the first graph and a second node from the second graph.

12. The method of claim 10, further comprising investigating nodes of the one-hop subgraph of the second graph having a highest counter to detect a miswiring.

13. The method of claim 10, further comprising, if the one-hop subgraph of the first graph and the one-hop subgraph of the second graph are isomorphic:
generating a two-hop subgraph of the first graph and a two-hop subgraph of the second graph,
the two-hop subgraph of the first graph comprising the first node of the first graph, nodes that are within two connection links from the first node of the first graph, and one or more links between any two nodes in the two-hop subgraph of the first graph, and the two-hop subgraph of the second graph comprising the first node of the second graph, nodes that are within two connection links from the first node of the second graph, and one or more links between any two nodes in the two-hop subgraph of the second graph.

14. The method of claim 10, further comprising determining that the first node of the first graph and the first node of the second graph are symmetrical to each other when a distribution of distances associated with the first node of the first graph is the same as a distribution of distances associated with the first node of the second graph.

15. The method of claim 14, wherein the distribution of distances between nodes is measured by a number of hops between nodes that are connected to each other in their respective topologies.

16. A method comprising:
selecting, by a processor, a first node from a first graph and a first node from a second graph that is symmetrical to the first node from the first graph, the first and second graphs having nodes arranged in respective topologies;
generating, by the processor, a one-hop subgraph of the first graph and a one-hop subgraph of the second graph, the one-hop subgraph of the first graph comprising at least nodes that are a single connection link from the first node of the first graph, and the one-hop subgraph of the second graph comprising at least nodes that are a single connection link from the first node of the second graph;
determining, by the processor, if the one-hop subgraph from the first graph and the one-hop subgraph from the second graph are isomorphic; and
if the one-hop subgraph of the first graph and the one-hop subgraph of the second graph are not isomorphic, incrementing counters that are associated with the nodes of the one-hop subgraph of the first graph and incrementing counters associated with the nodes of the one-hop subgraph of the second graph.

17. The method of claim 16, further comprising, if the one-hop subgraph of the first graph and the one-hop subgraph of the second graph are not isomorphic, and after the incrementing, selecting a second node from the first graph and a second node from the second graph.

18. The method of claim 16, further comprising investigating nodes of the one-hop subgraph of the second graph having a highest counter to detect a miswiring.

19. The method of claim 16, further comprising, if the one-hop subgraph of the first graph and the one-hop subgraph of the second graph are isomorphic:
generating a two-hop subgraph of the first graph and a two-hop subgraph of the second graph,
the two-hop subgraph of the first graph comprising the first node of the first graph, nodes that are within two connection links from the first node of the first graph, and one or more links between any two nodes in the two-hop subgraph of the first graph, and the two-hop subgraph of the second graph comprising the first node of the second graph, nodes that are within two connection links from the first node of the second graph, and one or more links between any two nodes in the two-hop subgraph of the second graph.

20. The method of claim 16, further comprising determining that the first node of the first graph and the first node of the second graph are symmetrical to each other when a distribution of distances associated with the first node of the first graph is the same as a distribution of distances associated with the first node of the second graph.

* * * * *